US008548863B2

(12) United States Patent
Diwakar

(10) Patent No.: US 8,548,863 B2
(45) Date of Patent: Oct. 1, 2013

(54) SYSTEM AND METHOD FOR SELECTING SERVICES FROM MULTIPLE CLOUD VENDORS

(75) Inventor: Kiran P. Diwakar, Pune (IN)

(73) Assignee: CA, Inc., Islandia, NY (US)

( * ) Notice: Subject to any disclaimer, the term of this patent is extended or adjusted under 35 U.S.C. 154(b) by 584 days.

(21) Appl. No.: 12/732,528

(22) Filed: Mar. 26, 2010

(65) Prior Publication Data

US 2011/0238515 A1   Sep. 29, 2011

(51) Int. Cl.
    *G06Q 30/00*   (2012.01)
(52) U.S. Cl.
    USPC ......................................................... 705/26.1
(58) Field of Classification Search
    USPC ................ 705/26.1, 26.2, 26.25, 26.3, 26.35,
          705/26.4, 26.41–26.44, 26.5, 26.61–26.64,
             705/26.7, 26.8, 26.81, 26.82, 26.9, 27.1,
                                                   705/27.2
    See application file for complete search history.

(56) References Cited

U.S. PATENT DOCUMENTS

| 8,341,441 B2 * | 12/2012 | Fletcher ....................... 713/320 |
| 2009/0144070 A1 * | 6/2009 | Psota et al. ........................ 705/1 |
| 2010/0332262 A1 * | 12/2010 | Horvitz et al. .................... 705/4 |
| 2011/0126197 A1 * | 5/2011 | Larsen et al. ..................... 718/1 |
| 2011/0161696 A1 * | 6/2011 | Fletcher ........................ 713/320 |
| 2012/0131101 A1 * | 5/2012 | Said et al. ...................... 709/204 |
| 2012/0180055 A1 * | 7/2012 | Brech et al. .................... 718/102 |
| 2012/0330711 A1 * | 12/2012 | Jain et al. ..................... 705/7.23 |
| 2012/0331113 A1 * | 12/2012 | Jain et al. ....................... 709/220 |

OTHER PUBLICATIONS

David Harrison; Michael Seiler, "The political economy of green office buildings", Journal of Property Investment & Finance v29n4/5 pp. 551-565. Retrieved from Dialog File 15, Acc#: 07646285.*

* cited by examiner

*Primary Examiner* — Naeem Haq

(74) *Attorney, Agent, or Firm* — Schwegman Lundberg & Woessner P.A.

(57) ABSTRACT

A system and method permits the selection of services from multiple cloud vendors. The system receives parameters relating to a plurality of services offered by a plurality of vendors in a plurality of cloud computing environments. The parameters relate to an actual cost charged by each of the vendors and a cost relating to an environmental impact of each of the vendors. The system calculates a value for each of the vendors as a function of the received parameters, and selects one or more vendors as a function of the calculated value. The system outputs to a display device one or more of the selected vendors and the calculated values for each of the vendors. In another embodiment, the system establishes a communication connection with one or more of the cloud computing environments, and invokes one or more applications or services from the one or more cloud computing environments.

21 Claims, 4 Drawing Sheets

200

205
RECEIVING PARAMETERS RELATING TO A PLURALITY OF COMPUTER SERVICES OFFERED BY A PLURALITY OF VENDORS IN A PLURALITY OF CLOUD COMPUTING ENVIRONMENTS. THE PARAMETERS RELATE TO AN ACTUAL COST CHARGED BY EACH OF THE VENDORS FOR AN INSTANCE OR SERVICE AND A COST RELATING TO AN ENVIRONMENTAL IMPACT OF EACH OF THE VENDORS.

210
A VALUE IS CALCULATED FOR EACH OF THE VENDORS AS A FUNCTION OF THE RECEIVED PARAMETERS.

215
ONE OR MORE VENDORS ARE SELECTED AS A FUNCTION OF THE CALCULATED VALUE.

220
THE SELECTED VENDORS AND THE CALCULATED VALUES FOR EACH OF THE VENDORS ARE OUTPUT TO A DISPLAY DEVICE.

225
THE RECEIVED PARAMETERS COMPRISE ONE OR MORE OF A COST OF THE SERVICE FOR EACH OF THE VENDORS, AN INDICATION OF AN EFFORT REQUIRED TO MANAGE THE SERVICE OF EACH OF THE VENDORS, A GEOGRAPHICAL LOCATION OF A DATA CENTER FOR THE SERVICE OF EACH OF THE VENDORS, AND DATA RELATING TO A COOLING SYSTEM USED IN THE DATA CENTER FOR THE SERVICE OF EACH OF THE VENDORS.

230
A VALUE IS ASSIGNED TO THE GEOGRAPHICAL LOCATION AS A FUNCTION OF A PROXIMITY OF THE GEOGRAPHICAL LOCATION TO A CUSTOMER

235
THE VALUE ASSIGNED TO THE GEOGRAPHICAL LOCATION IS A FUNCTION OF THE CLIMATE OF THE GEOGRAPHIC LOCATION (A)

*Fig. 2A*

SYSTEM AND METHOD FOR SELECTING SERVICES FROM MULTIPLE CLOUD VENDORS

TECHNICAL FIELD

The present disclosure relates to the selection of services, and in an embodiment, but not by way of limitation, a system and method for selecting services from multiple cloud vendors.

BACKGROUND

Cloud computing environments are progressive technologies that have turned around the manner in which business organizations examine the requirements and capacity to implement their data processing needs. A cloud computing environment includes capabilities where the cloud provider hosts the hardware and related items and provides systems and computational power as a service to the customer business organization. Consequently, when implementing data processing needs via a cloud vendor, a business organization does not need to bear the cost of space, energy, and maintenance in order to acquire the required computational resources at a reasonable cost.

BRIEF DESCRIPTION OF THE DRAWINGS

FIGS. 2A and 2B are a flowchart of an example embodiment of a method for selecting services from multiple cloud vendors.

DETAILED DESCRIPTION

With the increase in popularity of cloud computing, there has been a commensurate increase in the number of vendors who provide cloud-based computing services, and the number of vendors is expected to grow even more. To assist in analyzing this expanding pool of vendors, one or more embodiments of this current disclosure provide a system and method for determining the ideal and most cost effective resources that can be selected from a plurality of cloud-based vendors. In these embodiments, cost effective refers to the actual cost of a service of a vendor, and also the cost or the effect that a cloud service provider imparts on the environment of the planet. That is, an embodiment considers "green" issues when examining and selecting cloud service providers. The "greenness" of a cloud computing service provider can be assessed by determining what the energy utilization would be with the selection of a particular cloud computing service provider. One or more embodiments can also consider the corporate social responsibility (CSR) of a plurality of cloud computing vendors.

In analyzing a plurality of cloud computing service providers, the system does not necessarily select the least expensive cloud computing service provider. One reason for this is that the least expensive cloud computing service provider may not be the "greenest." This creates a challenge in that the system should optimize from both a cost as well as an energy supply perspective. The system takes a holistic approach towards ensuring a business organization's overall savings in selecting cloud computing providers for its data processing needs. Consequently, in an embodiment, the system provides the flexibility of associating an appropriate weight with the parameter that a particular vendor considers important. In some cases, it may be only the cost, in some cases only "green" considerations, and in other cases it could be a combination of both cost and greenness based on a user-defined weight that the business organization feels is appropriate.

One or more embodiments use several parameters that are normally considered by business organizations in determining which cloud service provider or providers to select. Informing the cloud service providers of these parameters will make these providers cognizant of their data centers and the energy utilization of these data centers. This energy utilization consideration will be affected by both operations and maintenance as well as cooling requirements.

In summary, one or more embodiments of the present disclosure will aid business organizations in selecting one or a mix of cloud computing service providers based on both economic and environmental advantages offered by the cloud service providers. A business organization can control the selection of the one, two, or more providers by selecting the correct parameters and setting appropriate policies that affect these parameters.

Figure 1:
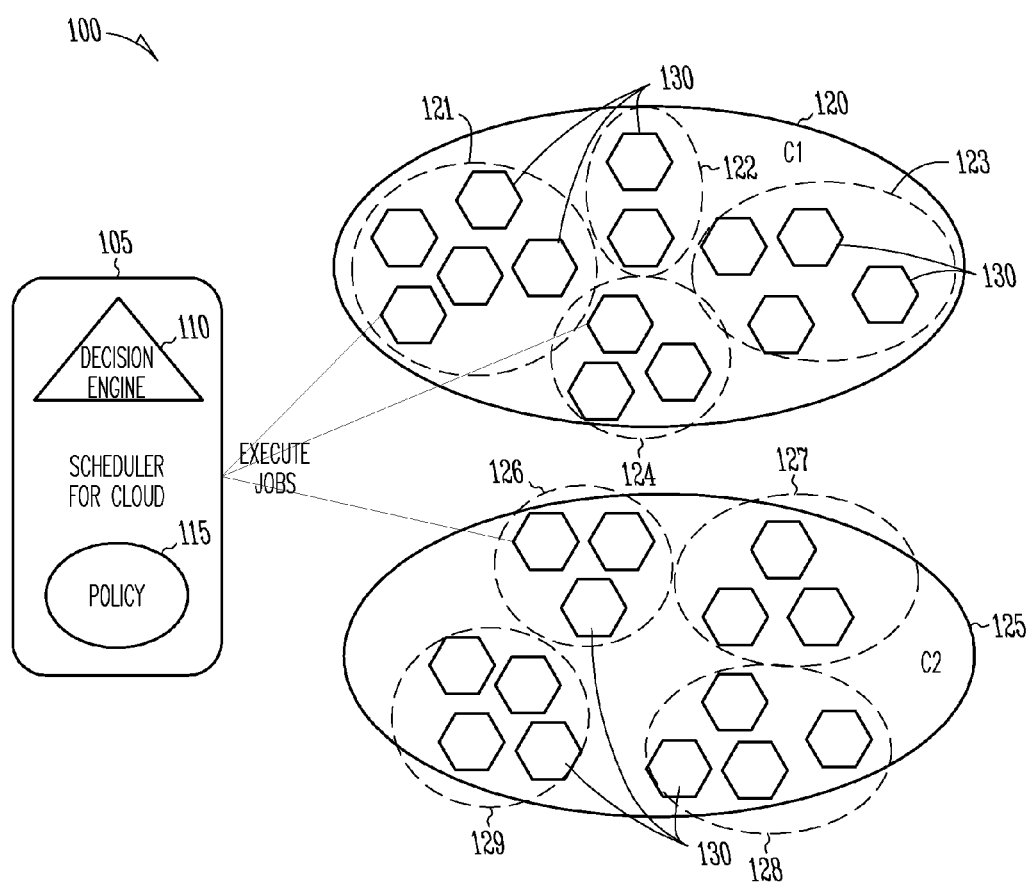
FIG. 1 is an illustration of an example embodiment of a system for selecting services from multiple cloud vendors.

FIG. 1 illustrates an example embodiment of a system 100 in which a plurality of cloud computing service providers can be analyzed and in which one, two, or more service providers can be selected to meet certain cost requirements, environmental impact standards, and policies of the business organization. The system 100 includes a cloud scheduler 105. The cloud scheduler 105 includes a decision engine 110 and a policy module 115. The cloud scheduler 105 can communicate with cloud computing environments 120 and 125. The cloud computing environments 120 and 125 can include multiple services 130, and these multiple services can be classified into groups 121, 122, 123, and 124 in cloud environment 120, and into groups 126, 127, 128, and 129 in cloud computing environment 125.

The cloud scheduler 105 will search for the appropriate service, process, or machine for one or more cloud computing vendors that are available. The decision engine 110 is configured to decide which instances (processes or services) should be selected from each cloud as a function of the cost of such service and the environmental impact of such service, that is, how green the service or service provider is.

The decision engine 110 uses one or more parameters to make the decision as to which cloud service providers meet the cost and environmental requirements. A first parameter is simply the cost itself—that is, how much does a cloud service provider charge for a particular service.

A second parameter relates to the ease or difficulty with which a particular instance or service can be managed. For example, if a particular service is associated with many ports within the cloud, this could add complexity to a business organization that uses this service. An increase in the number of ports could also result in an increased chance of security issues.

A third parameter is the geographical location of the data center from which the instance or service is being provided to the business organization. A cloud vendor would typically have hardware in key locations and the business organization would prefer the locations that are closer to the business organization. The selection of closer locations will result in better performance of the instance or process. For example, in FIG. 1, the instances are grouped by cloud vendors 120 and 125, and with each cloud vendor, there can be different data centers or geographic locations (such as 121, 122, 123, and 124 in vendor 120). So, if group 121 represents a data center that is located close to the business organization, this proximity could positively influence the choice of this cloud vendor and this particular location of this cloud vendor. This parameter, as with the other parameters, can be influenced by the policies of the business organization. For example, the business organization may have a policy to prefer a datacenter in a colder climate such as Montreal or Siberia, since the cooling needs of such a center would be minimal and hence more "green" for this parameter.

A fourth parameter relates to the type of cooling mechanism that is used for cooling the data center from which the instance originates. For example once again, a business organization may have a policy that natural cooling mechanisms such as solar powered systems, cold energy systems (in colder climates allowing such systems), hydro powered systems, and wind powered systems are the preferred type of cooling mechanisms.

Once these parameters have been determined for a particular cloud vendor, a formula can be used to determine a value for each cloud provider, and one or more cloud providers can be selected based on the determined value. For example, a simple summation of the parameter values could be performed as follows:

$$\text{Value} = A^*(\text{cost}) + B^*(\text{management ease}) + C^*(\text{data center location}) + D^*(\text{cooling mechanism})$$

In an embodiment, each of the parametric values could be normalized on a scale of 1 to 10 (or some other similar scale) across all the available cloud vendors. Based on the scale chosen, the highest or lowest value will determine which instance from which cloud vendor should be selected for handling a particular data processing need and for receiving the maximum economical and environmental benefits. The A, B, C, and D variables are weights that are defined by the business organization, and which allow a business organization to accordingly accentuate the parameters that are the most important to it.

The policy module 115 allows a user to create as well as store policies. During decision making activities, the user defined policies can be referred to, and can be used in the decision making process.

Figure 2B:
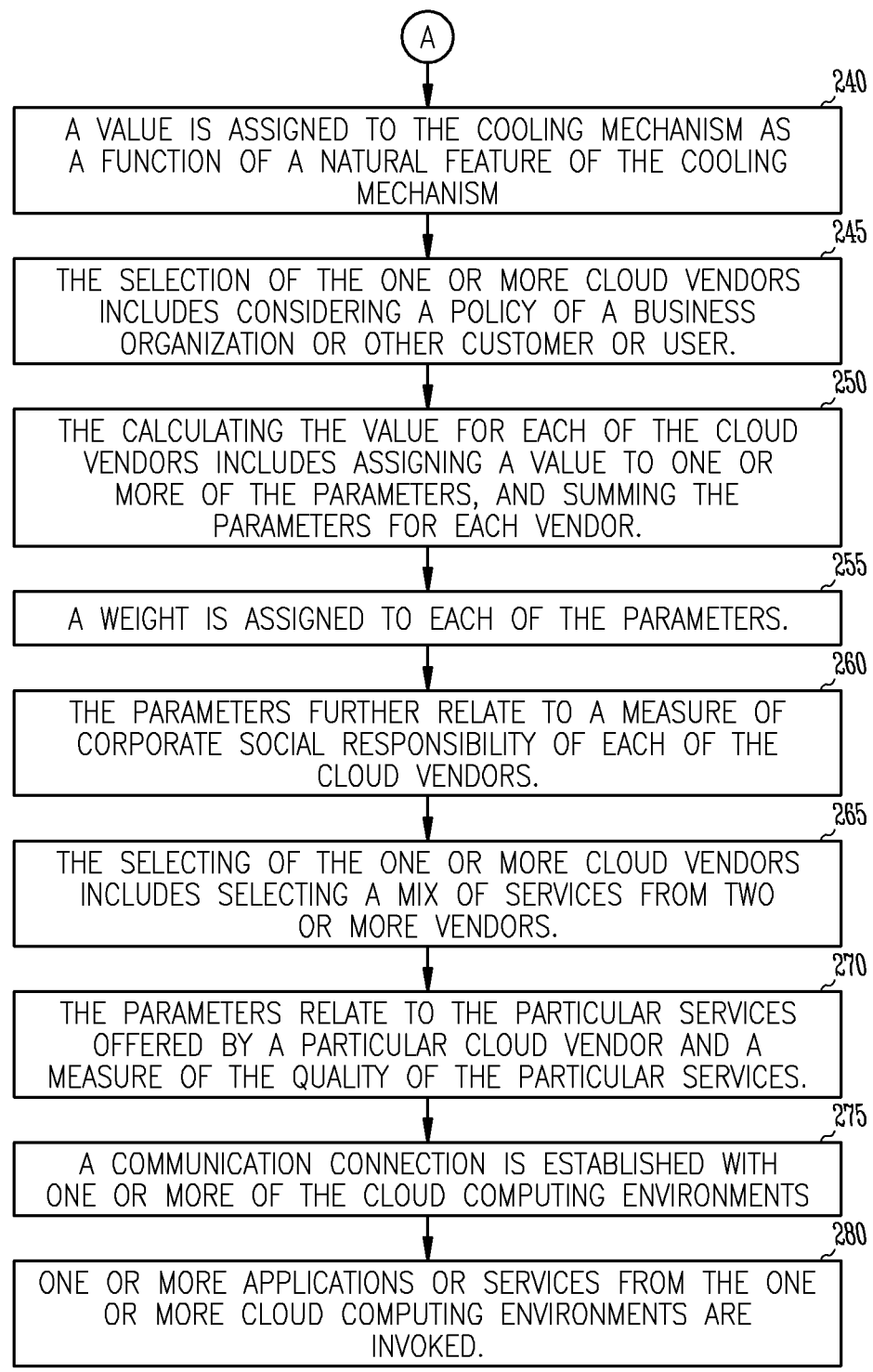

FIGS. 2A and 2B are a flowchart of an example process 200 for selecting services from multiple cloud vendors. FIGS. 2A and 2B include a number of process blocks 205-280. Though arranged serially in the example of FIGS. 2A and 2B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 2A and 2B, the process 200 includes at 205 receiving into one or more computer resources, such as a computer processor, parameters relating to a plurality of services offered by a plurality of vendors in a plurality of cloud computing environments. The parameters relate to an actual cost charged by each of the vendors for an instance or service and a cost relating to an environmental impact of each of the vendors. The environmental impact can relate to the energy utilization that is involved with a particular instance or service, with of course a higher energy expenditure having a greater negative impact on the environment.

At 210, a value is calculated for each of the vendors as a function of the received parameters. As noted above, an example of this calculated value is a simple summation of the values assigned to the parameters. As also noted above, these parameter values can be weighted. At 215, one or more vendors are selected as a function of the calculated value. If the parameter values are assigned such that the higher parameter values represent service features that are more favorable, then a higher calculated value would be more favorable and more apt to be selected. If parameter values are selected such that the lower parameter values are more favorable, then a lower parameter value would be more favorable and more apt to be selected. At 220, the selected vendors and the calculated values for each of the vendors can be output to a display device or computer memory.

At 225, the received parameters comprise one or more of a cost of the service for each of the vendors, an indication of an effort required to manage the service of each of the vendors, a geographical location of a datacenter for the service of each of the vendors, and data relating to a cooling system used in the datacenter for the service of each of the vendors. At 230, a value is assigned to the geographical location as a function of a proximity of the geographical location to a customer, and at 235, the value assigned to the geographical location is a function of the climate of the geographic location. Additionally, proximity would result in faster data access and data transfer.

At 240, a value is assigned to the cooling mechanism as a function of a natural feature of the cooling mechanism. Examples of such natural features or natural cooling mechanisms include solar powered systems, cold energy systems (in colder climates allowing such systems), hydro powered systems, and wind powered systems. At 245, the selection of the one or more cloud vendors includes considering a policy of a business organization or other customer or user. For example, the business organization could have a policy that a data center should be within 500 miles of at least 50% of its workforce.

At 250, the calculation of the value for each of the cloud vendors includes assigning a value to one or more of the parameters, and summing the parameters for each vendor. The value assigned to each parameter can be done by the cloud vendor, the business organization or other user, or a third party. If done by the cloud vendor, the cloud vendor should normally have data to support the value it assigns to its parameters. If assigned by a business organization or other user, this can be based on experience with that particular cloud vendor. If based on a third party, the parameter values can be based on research done by the independent third party.

At 255, a weight is assigned to each of the parameters. This is normally done by the user, and the weight assigned to a parameter indicates the importance of that parameter to the customer or user. At 260, the parameters further relate to a measure of corporate social responsibility of each of the cloud vendors. For example, if a particular cloud vendor is known for its charitable giving, a user may create a parameter for that, and assign a favorable value to it for that particular cloud vendor. The user may also give this parameter a higher weight to show the importance of this factor to the user.

At 265, the selecting of the one or more cloud vendors includes selecting a mix of services from two or more vendors. At 270, the parameters relate to the particular services offered by a particular cloud vendor and a measure of the quality of the particular services. For example, if a particular service is know to be quite stable, and known to have little down time and to require little maintenance, a favorable value can be assigned to this quality parameter. At 275, a communication connection is established with one or more of the cloud computing environments, and at 280, one or more applications or services from the one or more cloud computing environments are invoked.

Figure 3:
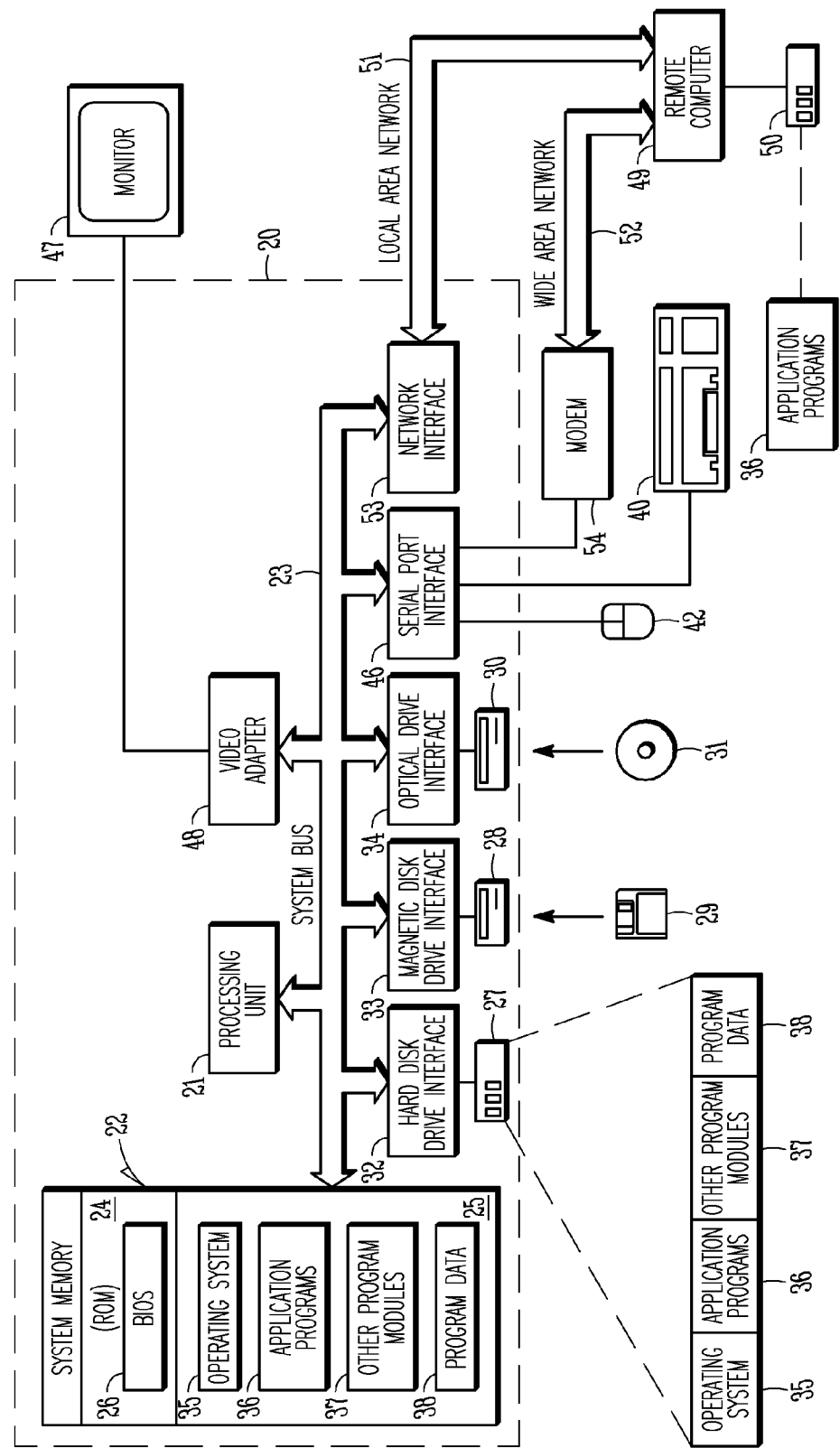
FIG. 3 is an example embodiment of a computer system upon which one or more embodiments of the present disclosure can operate.

FIG. 3 is an overview diagram of a hardware and operating environment in conjunction with which embodiments of the invention may be practiced. The description of FIG. 3 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 3, a hardware and operating environment is provided that is applicable to any of the servers and/or remote clients shown in the other Figures.

As shown in FIG. 3, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 3 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLE EMBODIMENTS

In Example 1, a computerized process includes receiving into one or more computer resources parameters relating to a plurality of services offered by a plurality of vendors in a plurality of cloud computing environments, the parameters further relating to an actual cost charged by each of the vendors and a cost relating to an environmental impact of each of the vendors. The process also includes calculating, based on the computer resources, a value for each of the vendors as a function of the received parameters. The process further includes selecting with the computer resources one or more vendors as a function of the calculated value, and outputting to a display device one or more of the selected vendors and the calculated values for each of the vendors.

Example 2 includes any of the features of Example 1, and further optionally includes a process wherein the received parameters comprise one or more of a cost of the computer service for each of the vendors, an indication of an effort required to manage the computer service of each of the vendors, a geographical location of a datacenter for the computer service of each of the vendors, and data relating to a cooling system used in the datacenter for the computer service of each of the vendors.

Example 3 includes any of the features of Examples 1-2, and further optionally includes assigning a value to the geographical location as a function of a proximity of the geographical location to a customer.

Example 4 includes any of the features of Examples 1-3, and further optionally includes a process wherein the value assigned to the geographical location is a function of the climate of the geographic location and the proximity of the geographical location.

Example 5 includes any of the features of Examples 1-4, and further optionally includes assigning a value to the cooling mechanism as a function of a natural feature of the cooling mechanism.

Example 6 includes any of the features of Examples 1-5, and further optionally includes a process wherein the selecting comprises considering a policy of a customer.

Example 7 includes any of the features of Examples 1-6, and further optionally includes a process wherein the calculating comprises assigning a value to one or more of the parameters, and summing the parameters for each vendor.

Example 8 includes any of the features of Examples 1-7, and further optionally includes assigning a weight to each of the parameters for each of the vendors.

Example 9 includes any of the features of Examples 1-8, and further optionally includes a process wherein the parameters further relate to a measure of corporate social responsibility of each of the vendors.

Example 10 includes any of the features of Examples 1-9, and further optionally includes a process wherein the selecting comprises selecting a mix of services from two or more vendors.

Example 11 includes any of the features of Examples 1-10, and further optionally includes a process wherein the parameters relate to the particular services offered by a particular vendor and a measure of the quality of the particular services.

Example 12 includes any of the features of Examples 1-11, and further optionally includes establishing a communication connection with one or more of the cloud computing environments, and invoking one or more applications or services from the one or more cloud computing environments.

Examples 1-12 can also be implemented as a computer system with one or more computer processors or as a process embedded on a machine readable medium.

Thus, an example system, method and machine readable medium for selecting services from multiple cloud vendors have been described. Embodiments of the invention include features, methods or processes embodied within machine-executable instructions provided by a machine-readable medium. In one embodiment, the term "machine-readable medium" or "computer-readable medium" shall be taken to include any tangible non-transitory medium which is capable of storing or encoding a sequence of instructions for execution by the machine and that causes the machine to perform any one of the methodologies. In a second embodiment separate from the first embodiment, the term "machine-readable medium" or "computer-readable medium" shall be taken to include any intangible transitory medium which is capable of storing or encoding a sequence of instructions for execution by the machine and that causes the machine to perform any one of the methodologies. Consequently, a machine-readable medium can be either transitory, non-transitory, tangible, or intangible in nature.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

The invention claimed is:

1. A computerized process comprising:
  receiving into one or more computer resources parameters relating to a plurality of services offered by a plurality of vendors in a plurality of cloud computing environments, the parameters further relating to an actual cost charged by each of the vendors and a cost relating to an environmental impact of each of the vendors;
  calculating, based on the computer resources, a value for each of the vendors as a function of the received parameters;
  selecting with the computer resources one or more vendors as a function of the calculated value; and
  outputting to another computer resource one or more of the selected vendors and the calculated values for each of the vendors;
  wherein the received parameters comprise a cost of the computer service for each of the vendors, an indication of an effort required to manage the computer service of each of the vendors, a geographical location of a datacenter for the computer service of each of the vendors, and data relating to a type of cooling system used in the datacenter for the computer service of each of the vendors.

2. The computerized process of claim 1, comprising assigning a value to the geographical location as a function of a proximity of the geographical location to a customer.

3. The computerized process of claim 2, wherein the value assigned to the geographical location is a function of the climate of the geographic location and the proximity of the geographical location.

4. The computerized process of claim 1, comprising assigning a value to the cooling mechanism as a function of a natural feature of the cooling mechanism.

5. The computerized process of claim 1, wherein the selecting comprises considering a policy of a customer.

6. The computerized process of claim 1, wherein the calculating comprises:
assigning a value to one or more of the parameters; and
calculating a single value using the parameters for each vendor.

7. The computerized process of claim 1, comprising assigning a weight to each of the parameters for each of the vendors.

8. The computerized process of claim 1, wherein the parameters further relate to a measure of corporate social responsibility of each of the vendors.

9. The computerized process of claim 1, wherein the selecting comprises selecting a mix of services from two or more vendors.

10. The computerized process of claim 1, wherein the parameters relate to the particular services offered by a particular vendor and a measure of the quality of the particular services.

11. The computerized process of claim 1, comprising:
establishing a communication connection with one or more of the cloud computing environments; and
invoking one or more applications or services from the one or more cloud computing environments.

12. A non-transitory machine-readable medium storing instructions, which, when executed by a processor, cause the processor to perform a process comprising:
receiving parameters relating to a plurality of services offered by a plurality of vendors in a plurality of cloud computing environments, the parameters further relating to an actual cost charged by each of the vendors, a cost relating to an environmental impact of each of the vendors, and a measure of corporate social responsibility of each of the vendors;
calculating a value for each of the vendors as a function of the received parameters;
selecting one or more vendors as a function of the calculated value; and
outputting to a computer resource one or more of the selected vendors and the calculated values for each of the vendors;
wherein the received parameters comprise one or more of a cost of the computer service for each of the vendors; an indication of an effort required to manage the computer service of each of the vendors; a geographical location of a datacenter for the computer service of each of the vendors; and data relating to a cooling system used in the datacenter for the computer service of each of the vendors; and
comprising instructions for assigning a value to the geographical location as a function of a proximity of the geographical location to a customer; wherein the value assigned to the geographical location is a function of the climate of the geographic location and the proximity of the geographical location.

13. The non-transitory machine-readable medium of claim 12, wherein the selecting comprises selecting a mix of services from two or more vendors.

14. The non-transitory machine-readable medium of claim 12, wherein the parameters relate to the particular services offered by a particular vendor and a measure of the quality of the particular services.

15. The non-transitory machine-readable medium of claim 12, comprising instructions for:
establishing a communication connection with one or more of the cloud computing environments; and
invoking one or more applications or services from the one or more cloud computing environments.

16. A system comprising:
one or more processors configured for:
receiving parameters relating to a plurality of services offered by a plurality of vendors in a plurality of cloud computing environments, the parameters further relating to an actual cost charged by each of the vendors and a cost relating to an environmental impact of each of the vendors;
calculating a value for each of the vendors as a function of the received parameters;
selecting one or more vendors as a function of the calculated value, wherein the selecting comprises considering a policy that a data center is located within a certain distance of a certain percentage of its workforce; and
outputting to a computer resource one or more of the selected vendors and the calculated values for each of the vendors.

17. The system of claim 16, wherein the received parameters comprise one or more of a cost of the computer service for each of the vendors; an indication of an effort required to manage the computer service of each of the vendors; a geographical location of a datacenter for the computer service of each of the vendors; and data relating to a cooling system used in the datacenter for the computer service of each of the vendors.

18. The system of claim 17, comprising instructions for assigning a value to the geographical location as a function of a proximity of the geographical location to a customer; wherein the value assigned to the geographical location is a function of the climate of the geographic location and the proximity of the geographical location.

19. The system of claim 16, comprising one or more processors configured for:
assigning a value to one or more of the parameters;
calculating a single value using the parameters for each vendor; and
assigning a weight to each of the parameters for each of the vendors.

20. The system of claim 16, comprising one or more processors configured for:
establishing a communication connection with one or more of the cloud computing environments; and
invoking one or more applications or services from the one or more cloud computing environments.

21. A non-transitory machine-readable medium storing instructions, which, when executed by a processor, cause the processor to perform a process comprising:
receiving parameters relating to a plurality of services offered by a plurality of vendors in a plurality of cloud computing environments, the parameters further relating to an actual cost charged by each of the vendors, a cost relating to an environmental impact of each of the vendors, and a measure of corporate social responsibility of each of the vendors;
calculating a value for each of the vendors as a function of the received parameters;
selecting one or more vendors as a function of the calculated value;
outputting to a computer resource one or more of the selected vendors and the calculated values for each of the vendors;
wherein the received parameters comprise one or more of a cost of the computer service for each of the vendors; an indication of an effort required to manage the computer service of each of the vendors; a geographical location of a datacenter for the computer service of each of the vendors; and data relating to a cooling system used in the datacenter for the computer service of each of the vendors;

assigning a value to the cooling system as a function of a natural feature of the cooling system;

assigning a value to one or more of the parameters;

calculating a single value using the parameters for each vendor; and assigning a weight to each of the parameters for each of the vendors.

* * * * *